(12) United States Patent
Laine et al.

(10) Patent No.: US 8,560,469 B2
(45) Date of Patent: Oct. 15, 2013

(54) METHOD FOR A PATTERN DISCOVERY AND RECOGNITION

(75) Inventors: Unto Laine, Vantaa (FI); Okko Rasanen, Kauniainen (FI)

(73) Assignee: Aalto-Korkeakoulusaatio, Aalto (FI)

( * ) Notice: Subject to any disclaimer, the term of this patent is extended or adjusted under 35 U.S.C. 154(b) by 196 days.

(21) Appl. No.: 13/142,532

(22) PCT Filed: Dec. 28, 2009

(86) PCT No.: PCT/FI2009/051041
§ 371 (c)(1),
(2), (4) Date: Sep. 28, 2011

(87) PCT Pub. No.: WO2010/076386
PCT Pub. Date: Jul. 8, 2010

(65) Prior Publication Data
US 2012/0023047 A1  Jan. 26, 2012

(30) Foreign Application Priority Data
Dec. 31, 2008  (FI) .................................. 20086260

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| | | | |
|---|---|---|---|
| 5,559,902 A | 9/1996 | Bose et al. | |
| 5,617,509 A | 4/1997 | Kushner et al. | |
| 5,924,066 A | 7/1999 | Kundu | |
| 2007/0031003 A1 | 2/2007 | Cremers | |

OTHER PUBLICATIONS

Finnish Search Report for priority application 20086260, dated Nov. 18, 2009.
Notification of Transmittal of the International Search Report and the Written Opinion of the International Searching Authority, or the Declaration for parent application PCT/FI2009/051041, having a mailing date of Jul. 30, 2010.
Kundu, Amlan et al, "Recognition of Handwritten Word: First and Second Order Hidden Markov Model Based Approach", Proceedings of the Conference on Computer Vision and Pattern Recognition, Jun. 5, 1988, pp. 457-462.
Saul, Lawrence and Pereira, Fernando, "Aggregate and Mixed-Order Markov Models for Statistical Language Processing", Proceedings of the Second Conference on Empirical Methods in Natural Language Processing, 1997, pp. 81-89.
Ney, Hermann et al, "On Structuring Probabilistic Dependences in Stochastic Language Modelling", Computer Speech and Language, vol. 8, No. 1, Jan. 1, 1994, pp. 1-38.

(Continued)

*Primary Examiner* — Kakali Chaki
*Assistant Examiner* — Ababacar Seck
(74) *Attorney, Agent, or Firm* — Andrus, Sceales, Starke & Sawall, LLP

(57) ABSTRACT

A method is for a pattern discovery and recognition, wherein a first sequence comprising first sequence symbols relating to a concept and a tag associated to the first sequence are received, transition probability matrices are obtained from transition frequency matrices representing the frequency data of the occurrences of the transitions between the first sequence symbols at different distances in the first sequence, and the transition probability matrices for each tag and each distance are learnt for obtaining an activation function determining the concept occurring in a second sequence. A computer program product and an apparatus are for executing the pattern discovery and recognition method.

9 Claims, 5 Drawing Sheets

(56) References Cited

OTHER PUBLICATIONS

Brun, A. et al, "Improving Language Models by Using Distant Information", Signal Processing and Its Applications, 9th International Symposium, Piscataway, New Jersey, USA, Feb. 12, 2007, pp. 1-4.

Rosenfeld, Ronald, "A Maximum Entropy Approach to Adaptive Statistical Language Modelling", Computer Speech and Language, vol. 10, No. 3, Jul. 1, 1996, pp. 187-228.

Guthrie, David et al, "A Closer Look at Skip-Gram Modelling", Proceedings of the 5th International Conference on Language Resources and Evaluation, 2006, pp. 1-4.

Goodman, Joshua T., "A Bit of Progress in Language Modeling", Computer Speech and Language, vol. 15, No. 4, Oct. 1, 2001, pp. 403-434.

Jurafsky, Daniel and Martin, James H., "Speech and Language Processing: An Introduction to Speech Recognition, Computational Linguistics and Natural Language Processing", Chapter 4 N-Grams, Jan. 7, 2007, pp. 1-42.

Jarvelin, Anni et al, "s-grams: Defining Generalized n-grams for Information Retrieval", Information Processing and Management, vol. 43, No. 4, 2007 (available Nov. 22, 2006), pp. 1005-1019.

Cavnar, William B. and Trenkle, John M., "N-Gram-Based Text Categorization", Proceedings, Annual Symposium on Document Analysis & Information Retrieval, Apr. 11, 1994, pp. 161-169.

Iyer, R. and Ostendorf, M., "Modeling Long Distance Dependence in Language: Topic Mixtures vs. Dynamic Cache Models", Spoken Language, 1996, Proceedings, Fourth International Conference, Philadelphia, Pennsylvania, USA, Oct. 3, 1996, pp. 236-239.

Rasanen, Okko et al, "Computational Language Acquisition by Statistical Bottom-Up Processing", Interspeech, vol. 8, Brisbane, Australia, Sep. 22-26, 2008, pp. 1980-1983.

Rasanen, Okko Johannes et al, "A Noise Robust Method for Pattern Discovery in Quantized Time Series: The Concept Matrix Approach", Proc. Interspeech, Sep. 6, 2009-Jun. 10, 2009, 4 pages.

METHOD FOR A PATTERN DISCOVERY AND RECOGNITION

CROSS-REFERENCE TO RELATED APPLICATIONS

This application is the U.S. national stage application of International Application No. PCT/FI2009/051041, filed Dec. 28, 2009, which International application was published on Jul. 8, 2010 as International Publication No. WO 2010/076386 A2 in the English language and which application is incorporated herein by reference. The International application claims priority of Finnish Patent Application No. 20086260, filed Dec. 31, 2008, which application is incorporated herein by reference.

TECHNICAL FIELD

The present disclosure relates to a method for a pattern discovery and recognition. The present disclosure also relates to a computer program product for a pattern discovery and recognition. Furthermore, the present disclosure relates to an apparatus for a pattern discovery and recognition.

BACKGROUND

A basic idea in all pattern discovery methods is to model statistical regularities and to compare a model to an actual representation in order to measure a similarity or similarities between the created (learned) model and a present pattern under analysis.

One of known methods and techniques utilised for modeling and recognizing patterns in sequences is the Markov model, which assumes that a sequence to be modelled has the Markov property. Having the Markov property means that, given a present state, future states are independent of past states. In other words, the description of the present state alone fully captures all information that could influence the future evolution of the process. The future states will be reached through a probabilistic process instead of a deterministic process.

At each step a system may change its state from the present state to another state, or remain in the same state, according to a certain probability distribution. The changes of the state are called transitions, and the probabilities associated with various state changes are called transition probabilities.

Many physical processes and corresponding observable sequences, which are created by the physical processes, have strong structures such as temporal structures which can be measured by higher order correlation coefficients. Thus, depending on the temporal resolution used the created sequence may have wide structures (over time or space), which cannot be modeled accurately by a Markov chain where future states are independent of the past states.

SUMMARY

One object is to provide a method for a pattern discovery and recognition, a computer program product for a pattern discovery and recognition, and an apparatus for a pattern discovery and recognition.

The object can be fulfilled by providing a method, wherein a first sequence comprising first sequence symbols relating to a concept and a tag associated to the first sequence are received, transition probability matrices are obtained from transition frequency matrices representing frequency data of occurrences of transitions between the first sequence symbols at different distances in the first sequence, and the transition probability matrices for each tag and each distance are learnt for obtaining an activation function determining the concept occurring in a second sequence.

The object can also be fulfilled by providing a computer program product, which receives a first sequence comprising first sequence symbols relating to the concept and a tag associated to the first sequence, obtains transition probability matrices from transition frequency matrices representing frequency data of occurrences of transitions between the first sequence symbols at different distances in the first sequence, and learns the transition probability matrices for each tag and each distance for obtaining an activation function determining the concept occurring in a second sequence.

Moreover, the object can be fulfilled by providing an apparatus, which receives a first sequence comprising first sequence symbols relating to the concept and a tag associated to the first sequence, obtains transition probability matrices from transition frequency matrices representing frequency data of occurrences of transitions between the first sequence symbols at different distances in the first sequence, and learns the transition probability matrices for each tag and each distance for obtaining an activation function determining the concept occurring in a second sequence.

According to an embodiment a method comprises receiving a first sequence comprising first sequence symbols relating to the concept and a tag associated to the first sequence, obtaining transition probability matrices from transition frequency matrices representing frequency data of occurrences of transitions between the first sequence symbols at different distances in the first sequence, and learning the transition probability matrices for each tag and each distance for obtaining an activation function determining the concept occurring in a second sequence.

The method according to the embodiments can be performed in an apparatus, which can be e.g. a computer system, a laptop or, a mobile phone, wherein a sowtware executes the pattern discovery and recognition process. Secondly, the pattern discovery and recognition process can be executed by a processor (e.g. digital signal processor (DSP) chip), which has been adapted to perform the pattern discovery and recognition process.

The term "concept" (pattern) refers to a certain type of statistical regularity in a sequence (or between two different sequences), which differs from other concepts (other regularities) and forms a clear contrast to all noise-like irregularities.

The term "tag" refers to an indication, which is associated to a sequence or several tags are associated to same sequence, and these associations are called concepts.

The term "transition" refers to sequence symbol (index, label) pairs. Sequence symbols are the basic elements of the sequences and sequence symbols pairs have distances between the sequence symbols inside a pair (In other words, each symbol pair has a certain location and mutual distance (difference in the locations) in the sequence).

According to an embodiment the method, which is disclosed in a previous embodiment, comprises receiving the first information comprising the concept. The first information can be e.g. speech or image.

According to an embodiment the method, which is disclosed in any of the previous embodiments, comprises associating the tag to the first sequence.

According to an embodiment the method, which is disclosed in any of the previous embodiments, comprises discretizing and quantizising first information comprising the concept, and representing the first information in a form of the one dimensional (1D-) first sequence. Also, visual (spatial) 2D-information can be sampled in different ways to form 1D-sequences. For this reason the detailed description limits to the sequential (1D) information only. In a more complicated case it is possible to deal with a set of 1D-sequences and also associations between these sequences (e.g. associations between audio and visual representations).

According to an embodiment the method, which is disclosed in any of the previous embodiments, collecting the frequency data of the occurrences of the transitions between the sequence symbols in the first sequence. It is formulated a group of matrices comprising at least one matrice, which consists of the frequency data, for each tag. The number of the matrices in the group depends on the number of the different distances of the symbol pairs collected from the sequence and the number of tags associated with concepts (e.g. matrix M(a,b|distance,tag), wherein a*b defines the size of the matrix, and the number of the matrices is equal to distances times tags).

According to an embodiment the method, which is disclosed in any of the previous embodiments, comprises storing the frequency data of the occurrences of the transitions in the first sequence to the transition frequency matrices.

According to an embodiment the method, which is disclosed in any of the previous embodiments, comprises normalizing the transition frequency matrices to the transition probability matrices according to later represented equations (1)-(3).

According to an embodiment the method, which is disclosed in any of the previous embodiments, wherein the second sequence(s) is processed from second real information comprising the concept by discretizing and quantizising the second information for representing the second information in a form of the second sequence(s).

According to an embodiment the method, which is disclosed in any of the previous embodiments, is used for a pattern recognition relating to e.g. a speech recognition or an image recognition. The used algorithm executing the method takes in an information stream given in discrete, quantized form. The information may be created by any time-varying process, e.g., audio-visual signals, or it may be only spatially varying, for example a still picture.

The method according to the embodiments can be performed in an apparatus, e.g. a computer system, a laptop or, a mobile phone, wherein a software executes the pattern discovery and recognition process.

Secondly, the pattern discovery and recognition process can be executed by a programmed processor (e.g. digital signal processor (DSP) chip), which is adapted to perform the pattern discovery and recognition process.

The algorithm executing the method according to the embodiments learns statistics by collecting evidence from real sequences, builds statistical models for these sequences, and applies them in the pattern discovery and classification.

The statistics are based on the frequency of the sequence symbol pairs found in different spatial distances in spatial cases or lags in temporal cases. In the case of time sequences the sequence symbol pairs can be interpreted as state transitions and their corresponding relative frequencies can be normalized to produce corresponding transitional probabilities. The number of occurrences of the different sequence symbol pairs can be collected to form a frequency matrix or a table. Every spatial or temporal distance (lag) will create a matrix or a table of its own. Correspondingly, associative statistics can be created between two different sequences.

The transition statistics are bound to the presence of a multimodal input (a tag) so that each tag indicates one concept (pattern) in the time series associated with it. After the training of the model, an unknown concept which is one of those learned earlier, can be recognized from a new sequence. The algorithm is tailored especially for pattern recognition in conditions where sequences are corrupted with high levels of distortion and noise, and conditions where dependencies of events are distributed over time or space, so that adjacent events cannot be reliably considered as dependent of each other.

One difference between the method according to the embodiments and the Markov chain is that the method according to the embodiments collects statistical evidence from a sequence first counting the number of all label pairs found at different distances and then performs two different normalisations (equations (1) and (2) in the detailed description), combines these two statistical representations before the third normalisation made to derive the final set of activation matrices.

Only one of the derived representations, the state transition matrix of the lag one, is equivalent with the representation known by the Markov chain method. In other two representations used in derivation of the activation matrices the treatment of the statistical evidence differs considerably from those previously known.

Another difference is that the Markov chain typically does not utilise statistics over lags larger than one and when it uses, the statistics can be derived from the lag one transition matrix by simple matrix multiplication (Chapman-Kolmogorov equation). In the method according to the embodiments the statistics over larger lags are taken directly from the sequence and not approximated (estimated) by a matrix multiplication.

Third difference between the method according to the embodiments and the Markov chain is that the method according to the embodiments of the invention utilises in parallel two different representations for every concept (equation (2)) and all the activation matrices obtained for label pairs of different distances (equation (4)). Thus, the combined activation pattern does not only depend on the present or earlier state but all those earlier events in the sequence described by the set of activation matrices.

The advantages of the method according to the embodiments emerge when dealing with data where a disturbance has fully destroyed or seriously corrupted original information in a limited temporal or spatial window. The original information can be recovered (corrected) only when a model is able to utilise the information available in the neighborhood, and even further, when the model is able to make proper associations based on the uncorrupted information in the vicinity.

BRIEF DESCRIPTION OF THE DRAWINGS

Next, the aspects will be described in greater detail with reference to exemplary embodiments in accordance with the accompanying drawings, of which

DETAILED DESCRIPTION

Figure 1:
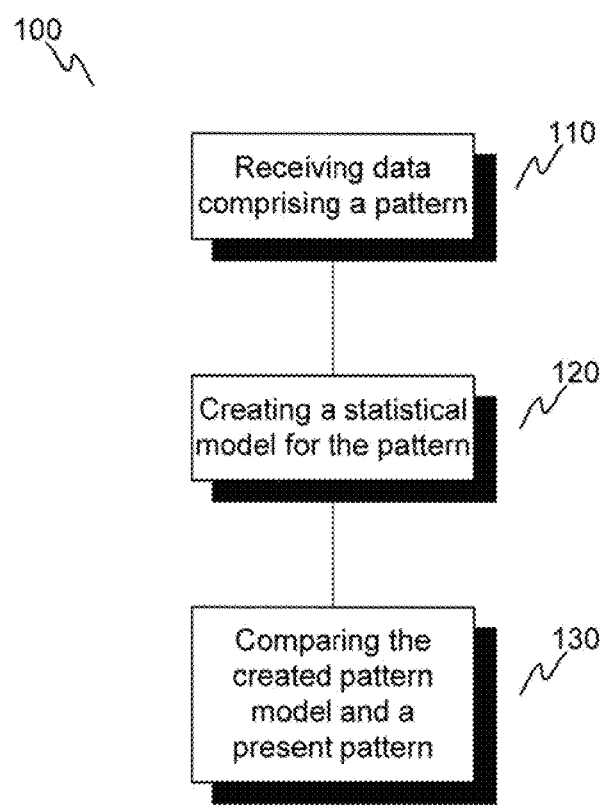
FIG. 1 illustrates an exemplary general flowchart of the method for a pattern discovery and recognition according to an advantageous embodiment.

FIG. 1 represents a general flowchart describing a pattern discovery and recognition method 100 according to the embodiment of the present disclosure.

At first in step 110 it is collected data, for example utterances comprising several words in a speech recognition process.

The collected data is processed during step 120 so that one can found from the processed data statistical regularities (patterns) and create statistical models for the found patterns. In the learning phase a simultaneous, external tag indicates which one of the set of patterns (to be recognized later) is present somewhere in the actual sequence.

Finally, the statistical models of the patterns are compared to new, previously unseen, real data for discovering similarities between the created statistical models of the patterns and a real pattern in step 130.

Figure 2A:
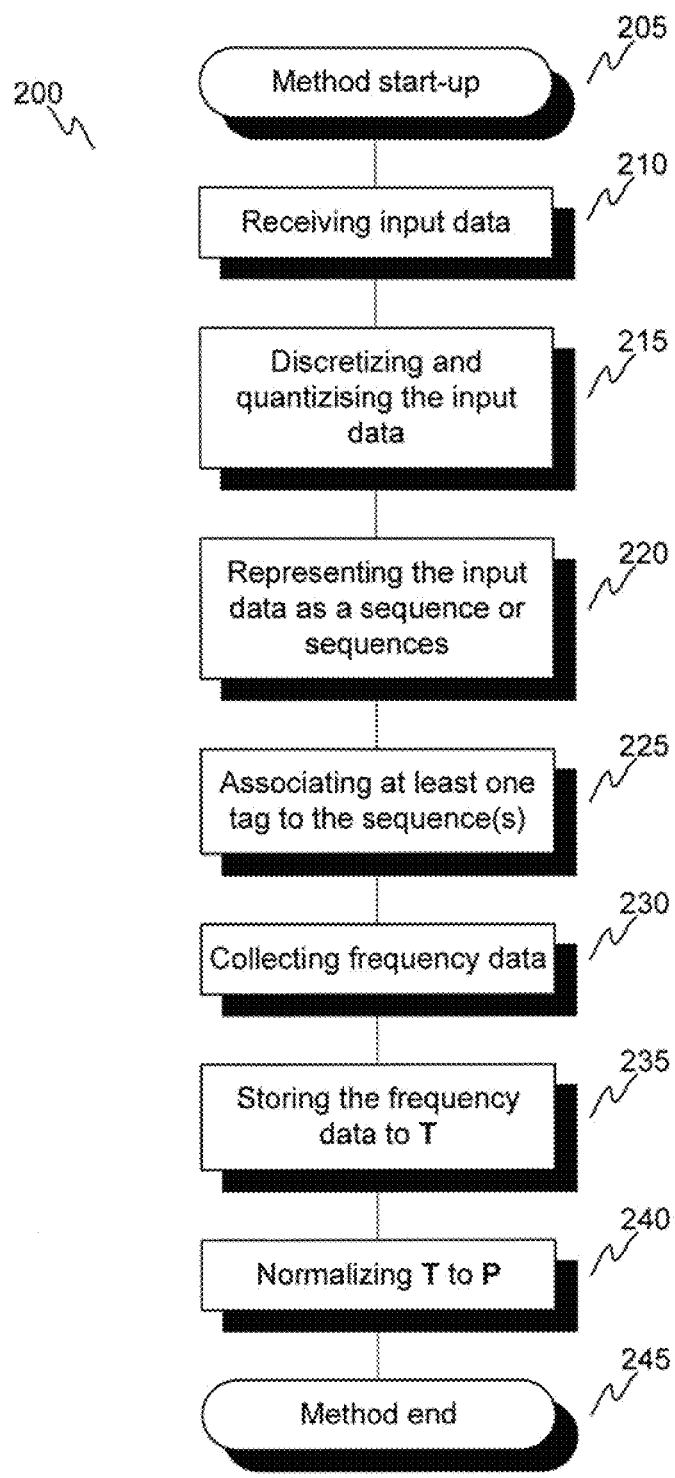
FIG. 2A illustrates an exemplary flowchart of the method for a pattern discovery according to an advantageous embodiment.

FIG. 2A discloses, by means of an example only, a flowchart describing a discovery method 200 according to the embodiment more detailed.

During the method start-up in step 205, a computer and/or an application executing the method is turned on and necessary stages before a pattern learning process, discovery, and regonition, such as the application set up definition and different variables and parameters initialisation, are provided.

In this case, a user defines the set up, variables, and parameters in view of the pattern learning, discovery, and regonition.

Next, in step 210, information used in the learning (training) process, such as utterances comprising one or more word spoken by a human, is introduced to a pattern discovery and recognition software through a receiver, e.g. a microphone, and a signal processing unit capable to modify the received audio signal to a proper form for the pattern discovery and recognition software.

In step 215 the received information (sample) is discretized and quantized, and after that, in step 220, the discrete and quantized information is represented in a form of 1D-sequence or sequences.

Then, in step 225, some event (pattern), which associates with the sequence(s) is specified by a tag, which can be e.g. a number or an alphabet.

So, input to the system consists of a time series of discrete elements or spatial information sampled to form 1D-sequences, and in training phase, tags specifying some event or pattern associated with the sequences. In some cases one information modality may provide a tag for another modality. The basic elements of the sequences are called labels and in the simplest case they may refer to items in a vector quantization codebook, or they can be produced by any kind of discretization of time-series or images. In a more complex case they may refer to same higher-level representation of information, e.g. events or items possible reflecting clear qualitative properties. An example could be modeling of stock markets and complex econometric processes. The other information source (possible another modality source) is represented by a set of so-called concept tags c.

Tags are typically integer values that represent invariant outputs of another process that are being associated to the time-series input (e.g. a categorization process performed in another modality like visual or haptic perception in case of speech recognition, or some other group of manually defined events that are wanted to be associated with the time-series).

The mechanism may work also to opposite direction; an acoustic event may serve as a tag to learn visual patterns. One modality may form tags to other modalities to help the learning. More generally, the method allows construction of statistical associations between different modalities. This is one of the key issues on the way to model and understand the formation and learning of meanings (by agents and humans).

In step 230, when the concept (tag) is activated and the sequence represented, the algorithm starts to collect frequency data of the occurrences of label pairs (transitions) in the sequence at a distance l.

The algorithm stores the collected frequency data of the occurrences of label pairs to a histogram table or a matrix T (transition frequency matrice) in step 235. The original labels can be used as pointers to T, when the number of occurrences of the corresponding label pair is needed.

During following step 240 the histogram collected in T is then used to produce another representation P.

The backbone of the algorithm is a matrix $P_{i,c}$, of size $N_q \times N_q$, where $N_q$ is size of the codebook, that resembles transition probability matrices but does not contain well-defined probabilities but sort of cumulative probability sums instead. It keeps record of normalized transition probabilities from label a[t−l] to label a[t] in the simultaneous presence of concept c, where l, c, t∈Z, and l is a member of set l={$l_1$, $l_2$, $l_3$, . . . ,$l_n$} and c is a member of set c={1, 2, 3, . . . $N_c$}. In other words, $N_c$ is the total number of concepts introduced to the system. If we define $N_l=\|l\|$ there are total $N_P=N_l*N_c$ instances of P matrices, one for each concept at a specific lag. A matrix $T_{i,c}$ is otherwise similar to $P_{i,c}$ except that it keeps record of the transition frequencies instead of normalized probabilities from label a[t−l] to label a[t] in the presence of concept c.

Since values of P are not classical probabilities in range between 0 and 1 due to a three-stage normalization process, values of P will be referred as activation values and P will be referred as activation matrix. Activation values stored in P will be computed by using frequency information stored in T.

Next, it is represented how the training is provided in the method. For simplicity of the notation, elements of matrices $P_{i,c}$ and $T_{i,c}$ are denoted in form $P(a_i,a_j|l,c)$ and $T(a_i,a_j|l,c)$, where the first two variables $a_i$ and $a_j$ define the matrix element indices of the labels (transition from $a_i$ to $a_j$ or co-occurrence of $a_i$ and $a_j$), whereas l defines the lag and c defines the concept.

The input consists of training sequences $S=(s_1, s_2, \ldots, s_n)$ and sequence related concepts $V=\{v_1, v_2, \ldots, v_n\}$, where each $v_i=\{c_1, c_2, \ldots, c_n\}$, v∈c. All transitions in the sequence $s_i$ occurring at lags l are updated to the transition frequency matrices $T_{i,c}$, where c is a member of the $v_i$ associated with s. This process is repeated for all S in the training material.

The following pseudocode example illustrates the collection process the transition frequencies:

```
for i = 1:length(S)
    s = S(i);
    v = V(i)
    for lag = 1:length(l)
        for t = 1:length(s)
            for c = 1:length(v)
                T(s[t-lag],s[t] | lag,c) = T(s[t-lag],s[t]lag,c) +1;
            end
        end
    end
end
```

In step 240, since all transitions occurring in the training material are added and stored to the transition frequency matrices T, the matrices are normalized to transition probability matrices P' by normalizing the transition probability from each label to all other labels $\Sigma_x Pr(a_i,a_x)=1$ by having $$P'(a_i, a_j | l_d, c_k) = \frac{T(a_i, a_j | l_d, c_k)}{\sum_{x=1}^{N_q} T(a_i, a_x | l_d, c_k)} \quad (1)$$

where $N_q$ is the codebook size, that is, the number of unique elements, in the time series.

The probability that a specific transition occurs during the presence of a tag instead of all other transitions is added cumulatively to the $P'_{i,c}$:

$$P''(a_i, a_j | l_d, c_k) = P'(a_i, a_j | l_d, c_k) + \frac{T(a_i, a_j | l_d, c_k)}{\sum_{x=1}^{N_q} \sum_{y=1}^{N_q} T(a_x, a_y | l_d, c_k)} \quad (2)$$

This enhances the value of those transitions that are very common in presence of the concept. It should be noted that the matrix is now no longer a well-defined transition probability matrix in a sense that the next state probabilities do not sum up to one. Therefore, values of P are from now on referred as (concept specific) activation values and outcomes of the recognition process are called concept activations.

Finally, a probability that a transition occurs during presence of a concept instead of any other concepts is incorporated to the final activation matrix P by having $$P(a_i, a_j | l_d, c_k) = \frac{P''(a_i, a_j | l_d, c_k)}{\sum_{z=1}^{N_c} P''(a_i, a_j | l_d, c_z)} - \frac{1}{N_c} \quad (3)$$

In other words, the cumulative probability of a transition from $a_i$ to $a_j$ in case of the tag c is divided by the sum of probabilities of the same transition occurring during all possible tags c. If a transition becomes equally probable for all concepts, therefore containing no information value, it would have a probability of 1/Nc. Therefore, each element in all matrices has $1/N_c$ subtracted from its value to have zero activation for fully random case and negative value for transitions that occur more often during other concepts. The aforesaid 1/N, subtraction is not necessary step, but it makes the process more convient.

When the training is completed, the method is ended in step 245.

Figure 2B:
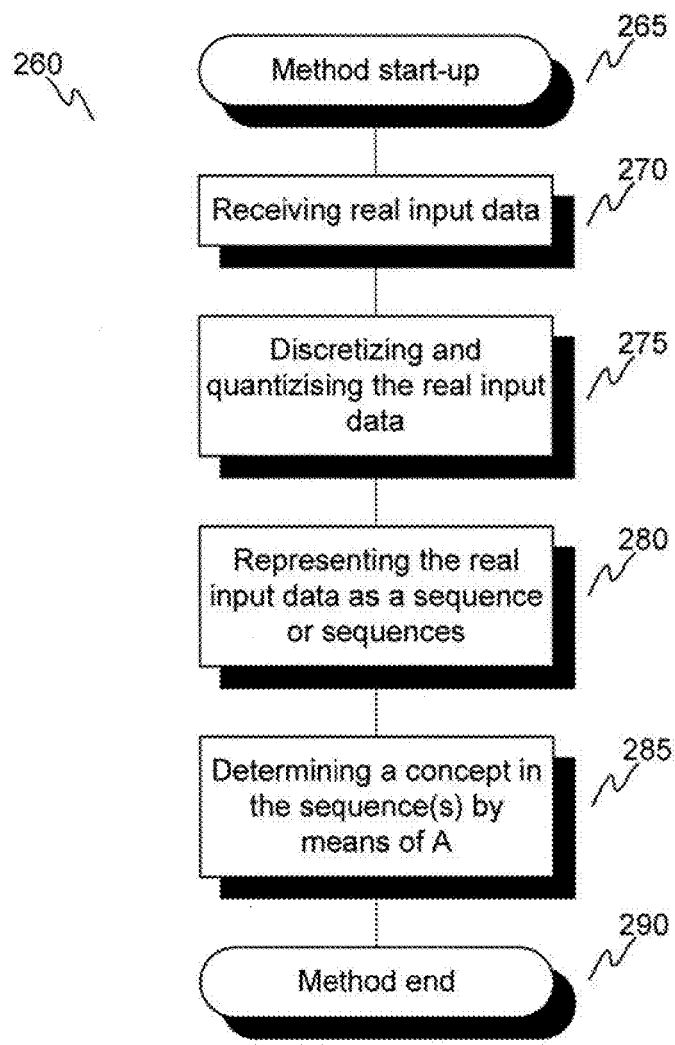
FIG. 2B illustrates an exemplary flowchart of the method for a pattern recognition according to an advantageous embodiment.

FIG. 2B illustrates, by means of an example only, a flowchart describing a pattern recognition method 260 according to the embodiment of the invention The start-up of the recognition process in step 265, is similar to the start-up of the the discovery process.

In step 270, it is introduced second information, real input data, to the system and the second information is processed by discretizing and quantisising for presenting the real input data in a form of a sequence or sequences having patterns during steps 275 and 280.

Next, in step 285, a concept from the real input data is determined by studying the transitions of the sequence(s). Transitions have transition probabilities P relating to each distance and each tag. These probabilities are estimated during the learning phase. The probabilities are combined to create an activation function A and the concept having the highest activation level will be recognized.

Therefore, the activation level of the concept $c_i$ at a time t given real input sequences can be expressed as $$A(c_i,t)=\Sigma_{d=1}^{N_l}P(s[t-l_d]s[t]|l_d,c_i) \quad (4)$$

when only backward history of the input sequence is included.

When the pattern recognition is completed, the method is ended in step 290.

It is also possible to have a bidirectional recognition process by including $P(s[t],s[t+1]|l_d,c_i)$ activation values to the sum in equation (4) if next labels up to largest lag max(l) in the sequence are known in advance. This enhances localization of the recognized event, as the peak value of the activation curve becomes centered to a point where there is most statistical support for the specific concept, distributed symmetrically around that point in terms of transitional probabilities.

Equation (4) provides a local activation estimate for each concept candidate but in many applications it is useful to examine the activation output in a larger temporal window since the events that are being recognized spread over several subsequent time frames. One possibility to do this is to first low-pass or median filter the activation curves in a larger temporal window. Then, each of these concept-related temporal activation curves is searched for a subsequence of length $L_i \in [L_{min}, L_{max}]$ having a maximum cumulative sum of activation values. After these subsequences are found for each concept model c, the subsequence i with highest cumulative sum defines the concept hypothesis $c_i$.

The $L_{min}$ sets a minimum temporal limit for the information that is included in the recognition decision process and should be at least as long as the shortest possible event being recognized. Similarly, $L_{max}$ defines a temporal upper limit for information integration and should be at least as long as the longest possible event being recognized. However, having even larger values for $L_{max}$ may be beneficial in several situation, as the context of an event contains often cues to the event itself and the statistics embedded in transition probability matrices take this information into account.

Summings (linear combination) in above-presented equations (2) and (4) are performed by weighting factors having value one. However, it is possible to use weighting factors α having values differing from one. These values can be determined on the grounds of some additional criterion, e.g. iteratively based on a pattern recognition success.

Moreover, it is also possible to run the entire algorithm in parallel for several synchronously quantized input streams in order to incorporate several sources of information. This transforms frequency and activation matrices into form $T_\Psi(a_i, a_j|l,c)$ and $P_\Psi(a_i,a_j|l,c)$, where $\Psi$ denotes number of the input stream being processed. Training is performed similarly to the single stream condition in order to build separate concept matrices for each concept at each lag and for each stream. In the testing phase probability output from all streams is combined to have a probability of a concept $c_i$ at time t of $$A(c,t) = \sum_{\Psi=1}^{|\Psi|} \left( \sum_{d=1}^{N_l} P_\Psi(s[t-l_d], s[t]|l_d, c_i) \right) * \omega_\Psi \quad (5)$$

where $\omega_\Psi$ is a weighting factor defined for each input stream.

Figure 3:
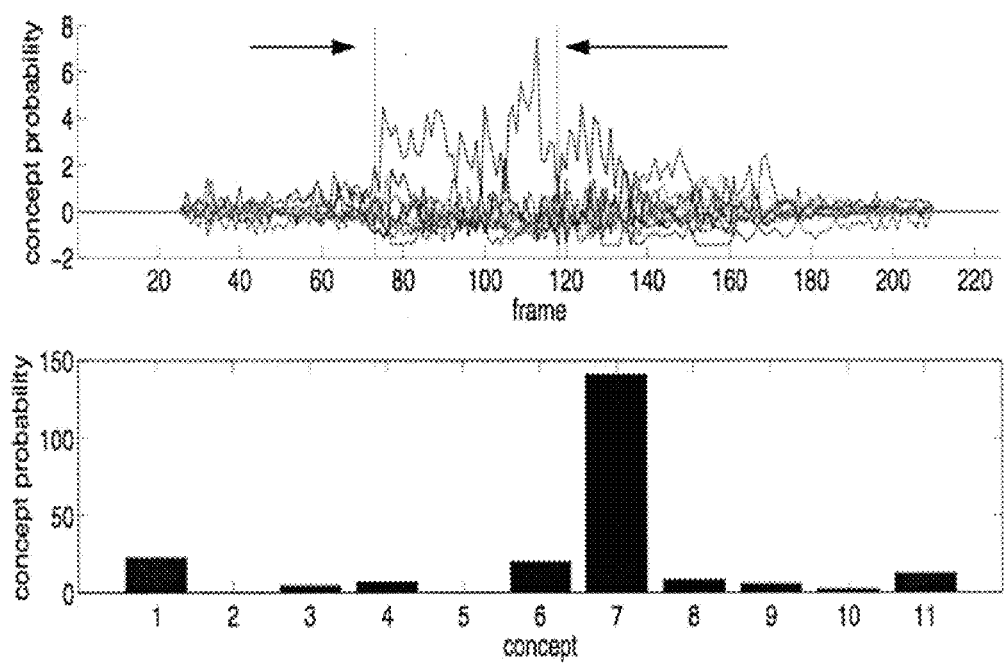
FIG. 3 illustrates a view of the activation of the word representations in utterance as a function of time without the median filtering of the activation.
Figure 4:
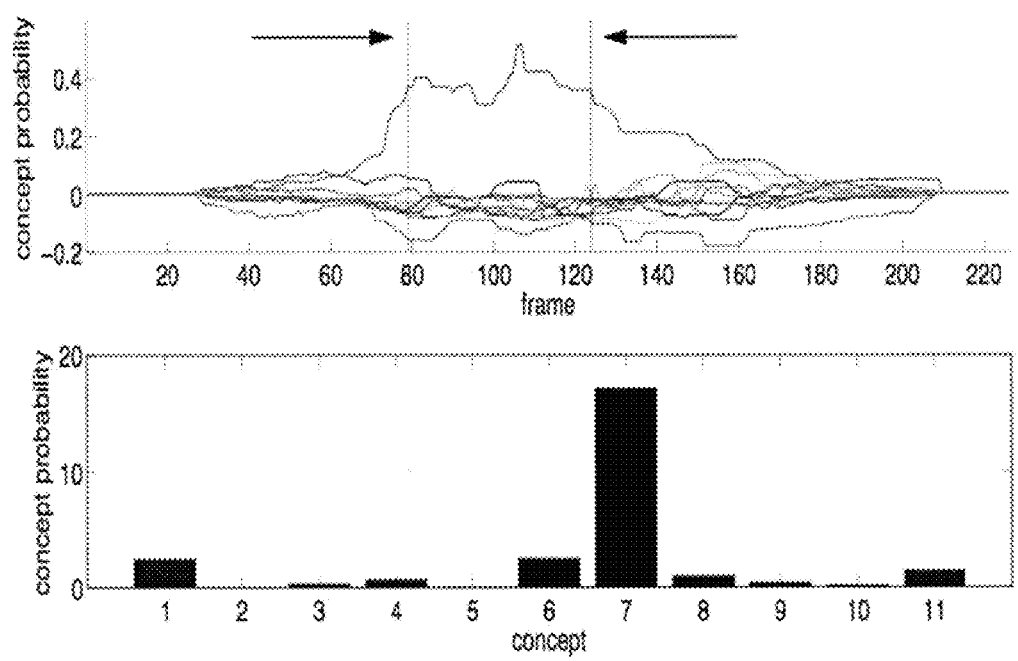
FIG. 4 illustrates a view of the activation of the word representations in utterance as a function of time with the median filtering of the activation.

In FIGS. 3 and 4 it is shown a result example relating to the described pattern recognition method.

The concept matrix algorithm was applied to an unsupervised word learning experiment. The aim was to learn 11 different keywords from a corpus containing 4000 utterances spoken by four speakers in British English (two males and two females, 1000 utterances each). Each utterance contains one to two keywords and comes with a meta-tag simulating presence of these keywords in another modality. 100% recognition accuracy is achieved when approximately 3000 utterances are dedicated for training and remaining 1000 for testing.

The speech material was quantized into one stream of vector quantization (VQ) indices (frame length of 10 ms, codebook size $N_c=150$) with k-means clustering algorithm. The Euclidean distance of static MFCC-vectors was used as a distance measure. The training was performed one utterance at a time with its associated concept tag. In the testing phase only the VQ stream of an utterance was used as input and the system had to recognize which keyword (concept tag) is embedded in the utterance. Activation curves were median filtered with 150 ms windowing and $L_{min}$ was set to 350 ms and $L_{max}$ to 450 ms.

FIG. 3 demonstrates the activation of the internal concept (or word) representations in utterance "Daddy comes closer" as a function of time without the median filtering of the activation. On the top of FIG. 3 is shown the activity of each concept as a function of time showing separate curves with probability values and on the bottom are the best cumulative sums of the subsequences found for each concept. Boundaries of the subsequence of the winning concept are pointed by arrows.

FIG. 4 shows the same process with the median filtering. One can see from the figure that the correct keyword "daddy" is recognized with clear marginal to other word candidates. Also, the median filtering integrates information over larger temporal window and therefore enhances the difference between concepts that receive continuous support from the input and those that only randomly find something familiar structure in it. On the top is the activity of each concept as a function of time showing separate curves with probability values and on the bottom are shown the best cumulative sums of the subsequences found for each concept. Boundaries of the subsequence of the winning concept are pointed by arrows.

Figure 5:
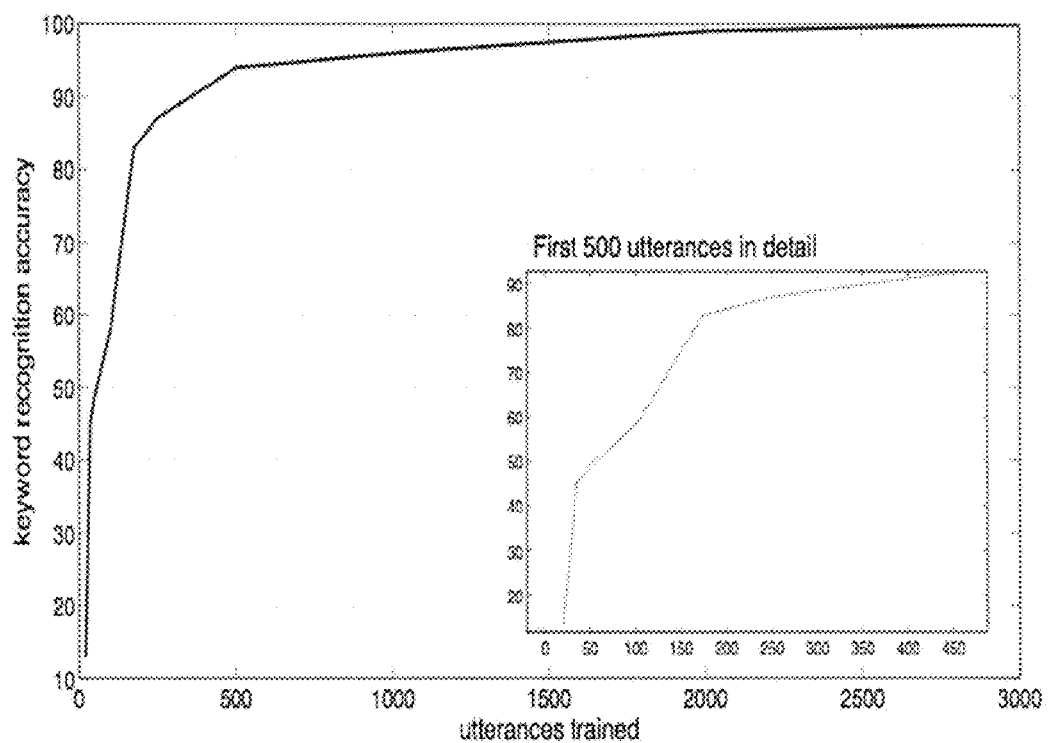
FIG. 5 illustrates a view of the characteristic learning curve of the algorithm.

FIG. 5 displays the characteristic learning curve of the algorithm as a function of number of trained utterances. The learning curve reveals that the recognition rate increases very quickly after only few tokens and achieves 100% accuracy at 3000 utterances. First 500 utterances are shown in detail on the bottom right.

The invention has been now explained above with reference to the aforesaid embodiments and the several advantages of the invention have been demonstrated. It is clear that the invention is not only restricted to these embodiments, but comprises all possible embodiments within the spirit and scope of the invention thought and the following patent claims.

The invention claimed is:

1. A method for recognizing a pattern from a signal by a processor, the method comprising:
    receiving, by a processor, a first signal, which forms first information comprising the pattern,
    forming, by a processor, a first discretized one-dimensional symbol sequence from the received first signal and specifying the pattern in the first sequence by a tag,
    obtaining, by a processor, a transition frequency matrix by incrementing frequency data to a matrix element corresponding with each lag of the first sequence concerning the tag, when the first sequence has a transition of symbol sequences at said lag relating to said tag,
    obtaining, by a processor, transition probability matrices by normalizing transition frequency matrices by all possible transitions, where each element in each transition probability matrice represents a probability of the tag at each lag, and obtaining tag probability matrices from the transition probability matrices, which tag probability matrices represent in the first sequence a probability of each tag at each transition and at each lag,
    receiving, by a processor, a second signal, which forms second information, and
    recognizing, by a processor, the pattern in a second symbol sequence, which is formed from the received second signal, by determining probabilities of tags from each tag propability matrice for all transitions of symbol sequences in the second sequence at different lags and by summing probabilities of all transitions at different lags for each tag in order to detect a tag having a maximum value.

2. The method of claim 1, which further comprises summing the obtained sum probabilities in a temporal window having a length that corresponds with an expected duration of the pattern to be recognized for detecting the maximum value tag.

3. The method of claim 1, wherein the result of recognition is processed by a low-pass or median filtering.

4. The method of claim 1, wherein a length of a low-pass or median filter is estimated by a length of the pattern.

5. The method of claim 1, which further comprises storing the collected frequency data of the occurrences of the transitions in the first sequence to the transition frequency matrices.

6. The method of claim 1, wherein the second signal is discretized and quantized for representing it in a form of the second sequence.

7. The method of claim 1, which is used for a speech recognition or an image recognition.

8. A tangible computer-readable medium bearing computer program code embodied therein for use with a processor, the computer program code being configured, when run by a processor, to execute a method for recognizing a pattern from a signal by a processor, the method comprising:
    receiving, by a processor, a first signal, which forms first information comprising the pattern,
    forming, by a processor, a first discretized one-dimensional symbol sequence from the received first signal and specifying the pattern in the first sequence by a tag,
    obtaining, by a processor, a transition frequency matrix by incrementing frequency data to a matrix element corresponding with each lag of the first sequence concerning the tag, when the first sequence has a transition of symbol sequences at said lag relating to said tag,
    obtaining, by a processor, transition probability matrices by normalizing transition frequency matrices by all possible transitions, where each element in each transition probability matrice represents a probability of the tag at each lag, and obtaining tag probability matrices from the transition probability matrices, which tag probability matrices represent in the first sequence a probability of each tag at each transition and at each lag,
    receiving, by a processor, a second signal, which forms second information, and
    recognizing, by a processor, the pattern in a second symbol sequence, which is formed from the received second signal, by determining probabilities of tags from each tag propability matrice for all transitions of symbol sequences in the second sequence at different lags and by summing probabilities of all transitions at different lags for each tag in order to detect a tag having a maximum value.

9. An apparatus configured to execute a method for recognizing a pattern from a signal by a processor, the method comprising:

receiving, by a processor, a first signal, which forms first information comprising the pattern, forming, by a processor, a first discretized one-dimensional symbol sequence from the received first signal and specifying the pattern in the first sequence by a tag, obtaining, by a processor, a transition frequency matrix by incrementing frequency data to a matrix element corresponding with each lag of the first sequence concerning the tag, when the first sequence has a transition of symbol sequences at said lag relating to said tag, obtaining, by a processor, transition probability matrices by normalizing transition frequency matrices by all possible transitions, where each element in each transition probability matrice represents a probability of the tag at each lag, and obtaining tag probability matrices from the transition probability matrices, which tag probability matrices represent in the first sequence a probability of each tag at each transition and at each lag, receiving, by a processor, a second signal, which forms second information, and recognizing, by a processor, the pattern in a second symbol sequence, which is formed from the received second signal, by determining probabilities of tags from each tag propability matrice for all transitions of symbol sequences in the second sequence at different lags and by summing probabilities of all transitions at different lags for each tag in order to detect a tag having a maximum value.

* * * * *